(12) United States Patent
Grishkewich et al.

(10) Patent No.: US 12,472,471 B1
(45) Date of Patent: Nov. 18, 2025

(54) GRAPHENE OXIDE COMPOSITE MEMBRANES

(71) Applicant: Evercloak Inc., Kitchener (CA)

(72) Inventors: Nathan Julius Grishkewich, Kitchener (CA); Mahshid Chekini, Waterloo (CA); Periklis Dimitrios Alikiotis, Etobicoke (CA); Cecilia Natalina Cancellara, Caledon (CA); Michael Allan Pope, Kitchener (CA)

(73) Assignee: Evercloak Inc., Kitchener (CA)

( * ) Notice: Subject to any disclaimer, the term of this patent is extended or adjusted under 35 U.S.C. 154(b) by 0 days.

(21) Appl. No.: 18/739,856

(22) PCT Filed: Mar. 22, 2023

(86) PCT No.: PCT/CA2023/050377
§ 371 (c)(1),
(2) Date: Jun. 11, 2024

(87) PCT Pub. No.: WO2023/184017
PCT Pub. Date: Oct. 5, 2023

Related U.S. Application Data

(60) Provisional application No. 63/325,355, filed on Mar. 30, 2022.

(51) Int. Cl.
*B01D 53/22* (2006.01)
*B01D 53/26* (2006.01)
(Continued)

(52) U.S. Cl.
CPC ......... *B01D 69/148* (2013.01); *B01D 53/228* (2013.01); *B01D 53/268* (2013.01);
(Continued)

(58) Field of Classification Search
CPC ............ B01D 69/148; B01D 67/00793; B01D 69/107; B01D 71/0211; B01D 69/14111;
(Continued)

(56) References Cited

U.S. PATENT DOCUMENTS

| 9,353,037 B2 | 5/2016 | Chu et al. |
| 10,315,155 B2 | 6/2019 | Chu et al. |

(Continued)

FOREIGN PATENT DOCUMENTS

| CN | 108276615 A | 7/2018 |
| CN | 108997622 A | 12/2018 |

(Continued)

OTHER PUBLICATIONS

International Search Report and Written Opinion dated Jun. 7, 2023 on PCT/CA2023/050377.
(Continued)

*Primary Examiner* — Anthony R Shumate
(74) *Attorney, Agent, or Firm* — Brunet & Co. Ltd.; Robert Brunet; Hans Koenig

(57) ABSTRACT

A system involves interleaving high aspect ratio, rod-like aldehyde-modified cellulose nanomaterials (ACN) between graphene oxide (GO) sheets and utilizing crosslinkers to create a dense, crosslinked network that is highly permeable and selective to a molecule of interest, especially water and water vapor, and does not delaminate in water. This system, especially when combined with oxidative surface treatment of a membrane support substrate, leads to improved adhesion of the membrane on the substrate.

16 Claims, 14 Drawing Sheets

(51) Int. Cl.
  *B01D 67/00* (2006.01)
  *B01D 69/02* (2006.01)
  *B01D 69/10* (2006.01)
  *B01D 69/14* (2006.01)
  *B01D 71/02* (2006.01)
  *B01D 71/10* (2006.01)

(52) U.S. Cl.
  CPC ....... *B01D 67/00793* (2022.08); *B01D 69/02* (2013.01); *B01D 69/107* (2022.08); *B01D 69/14111* (2022.08); *B01D 71/0211* (2022.08); *B01D 71/10* (2013.01); *B01D 2257/80* (2013.01); *B01D 2258/06* (2013.01); *B01D 2323/30* (2013.01); *B01D 2325/24* (2013.01)

(58) Field of Classification Search
  CPC .... B01D 53/228; B01D 53/268; B01D 69/02; B01D 71/10; B01D 2257/80; B01D 2258/06; B01D 2323/30; B01D 2325/24
  See application file for complete search history.

(56) References Cited

U.S. PATENT DOCUMENTS

| | | | |
|---|---|---|---|
| 10,974,208 | B2 | 4/2021 | Dave et al. |
| 2004/0159233 | A1* | 8/2004 | Simmons ............. B01D 53/228 585/818 |
| 2010/0186586 | A1* | 7/2010 | Chinn ................... B01D 53/22 96/10 |
| 2014/0283839 | A1* | 9/2014 | Wickham ............. B01D 53/228 128/205.27 |
| 2015/0141711 | A1 | 5/2015 | Chu et al. |
| 2015/0258506 | A1* | 9/2015 | Mi ........................ C01B 32/198 156/273.1 |
| 2017/0157555 | A1* | 6/2017 | Karode ................... C10L 3/104 |
| 2017/0157556 | A1* | 6/2017 | Karode ................... B01D 53/72 |
| 2017/0341034 | A1 | 11/2017 | Dave et al. |
| 2019/0193033 | A1* | 6/2019 | Sahadevan ........... B01D 69/148 |
| 2019/0247806 | A1* | 8/2019 | Xu ...................... B01D 67/0013 |
| 2019/0388842 | A1* | 12/2019 | Zheng .................... B01D 71/56 |
| 2020/0261861 | A1* | 8/2020 | Zheng ............. B01D 67/00791 |
| 2021/0178336 | A1* | 6/2021 | Zheng ................ B01D 71/0211 |
| 2021/0178337 | A1 | 6/2021 | Mathew et al. |
| 2021/0229029 | A1* | 7/2021 | Zheng .................. B01D 53/268 |
| 2022/0127142 | A1* | 4/2022 | Hill ................. B01D 71/02231 |

FOREIGN PATENT DOCUMENTS

| | | |
|---|---|---|
| CN | 109273282 A | 1/2019 |
| CN | 110075768 A | 8/2019 |

OTHER PUBLICATIONS

Aditya T, et al. RSC Adv., 2019, 9, 21329.
Das G, et al. Scientific Reports (2019) 9:9572.
Herrera-Alonso M, et al. Langmuir 2007, 23, 10644-10649.
Hung W-S, et al. Chem. Mater. 2014, 26, 2983-2990.
Hung W-S, et al. Separation and Purification Technology 239 (2020) 116499.
Jia Z, et al. Abstract of Journal of Membrane Science 520 (2016) 139-144.
Jia Z, et al. Abstract of Carbon 101 (2016) 290-295.
Jia W, et al. Abstract of Journal of Material Chemistry A 36 (2019), Stable functionalized graphene oxide-cellulose nanofiber solid electrolytes with long-range 1D/2D ionic nanochannels.
Kim YS, et al. Abstract of Chem. Mater. (2014) 26, 19, 5549-5555.
Li M, et al. Materials and Design 181 (2019) 107961.
Li Z, et al. Abstract and supporting information of ACS Appl. Mater, Interfaces (2020) 12, 49, 55205-55214.
Liu P, et al. Abstract of Journal of Hazardous Materials 371 (2019) 484-493.
Maslekar N, et al. Nanoscale Adv., 2020, 2, 4702.
Mianehrow H, et al. J. Mater. Chem. A, 2020, 8, 17608.
Qian Y, et al. Abstract of Carbon 136 (2018) 28-37.
Rappolo I, et al. Abstract of New Journal of Chemistry 4 (2015) Study of benzophenone grafting of reduced graphene oxide by unconventional techniques.
Saito T, et al. Colloids and Surfaces A: Physicochem. Eng. Aspects 289 (2006) 219-225.
Sarkar G, et al. Abstract of RCS Advances 42 (2016) Cross-linked methyl cellulose/graphene oxide rate controlling membranes for in vitro and ex vivo permeation studies of diltiazem hydrochloride.
Song N, et al. Abstract and supporting information of ACS Appl. Mater. Interfaces (2017) 9, 3, 2924-2932.
Wan W, et al. Adv. Funct. Mater. 2014, 24, 4915-4921.
Wang J, et al. Journal of Nanomaterials. vol. 2017, Article ID 5150613, 10 pages.
Wang Y, et al. ACS Omega 2019, 4, 15373-15381.
Wang C, et al. Abstract of ACS Appl. Nano. Mater. (2019) 2, 7, 4193-4202.
Wu H, et al. Abstract of Composites Science and Technology 171 (2019) 190-198.
Yang W, et al. Abstract of Journal of Materials Chemistry C 15 (2017) Ultrathin flexible reduced graphene oxide/cellulose nanofiber composite films with strongly anisotropic thermal conductivity and efficient electromagnetic interference shielding.
Yu H, et al. Abstract of Carbohydrate Polymers 240 (2020) 116348.
Zhang Y-S, et al. Abstract of Energy Storage Materials 34 (2021) 45-52.
Zhu C, et al. ACS Appl. Mater. Interfaces 9 (2017) 21048-21058.
Zhu C, et al. Abstract and supporting information of ACS Nano (2018) 12, 7, 7027-7038.

* cited by examiner

GRAPHENE OXIDE COMPOSITE MEMBRANES

CROSS-REFERENCE TO RELATED APPLICATIONS

This application is a § 371 national entry of PCT Application PCT/CA2023/050377 and claims the benefit of U.S. Ser. No. 63/325,355 filed Mar. 30, 2022, the entire contents of both of which are herein incorporated by reference.

FIELD

This application relates to graphene oxide composite membranes, in particular to graphene oxide cellulose nanofiber membranes, methods of preparation thereof and uses thereof, especially for use in separations.

BACKGROUND

Graphene oxide (GO) membranes are known for high water and water vapor permeance, but will swell or delaminate when soaked in water, due to the hygroscopic nature of GO. Crosslinked graphene oxide membranes for use in air dehumidification are also known with the primary aim of separating water vapor from air.

Further, cellulose nanomaterial and graphene oxide composites are known, particularly as macro-porous aerogel or hydrogel structures, but have not been investigated for use in membranes for dehumidification or pervaporation. These macro-porous materials would not possess any selectivity as a membrane material.

A recently developed double-layered CNF-GO composite membrane (US 2021/178337) showed an improved mechanical property, such as an increase in modulus and strength of the composite membrane, in comparison with a membrane made of only CNF or an isotropic single layer membrane made of mixed CNF-GO. The GO concentrations ranged from 0.5 to 4 wt %, based on weight sum of the GO and the CNF.

Although most CNF-GO composites are developed to improve membrane strength and stability in applications such as adsorption, separation, and purification, such composites generally utilized a large fraction of cellulosic materials (such as CNFs) to GO. The largest GO fraction known to us was demonstrated in two cases: one where 80 mg of pure cellulose and 100 mg of GO were used to fabricate aerogels for water purification and removal of antibiotics (Wang et al., *Journal of Nanomaterials*, Volume 2017, Article ID 5150613, 10 pages); and, another where higher ratios of GO to carboxymethyl cellulose fibers from 5/5 to 9/1 were explored for application in heavy metal ion removal (Yu et al., *Carbohydrate Polymers*, Volume 240, 116348 (2020)).

In addition, a multilayered structure composite with one layer made of non-woven nanofibrous scaffold and a second layer composed of GO was developed for pervaporation applications such as the separation of water and ethanol (U.S. Pat. No. 9,353,037).

Despite advances, there remain difficulties to the preparation of GO membranes that maintain a good balance of selectivity and permeance on the one hand and abrasion resistance and adherence to substrates on the other hand. There still remains a need for graphene oxide (GO) separation membranes that have improved mechanical strength, abrasion resistance and/or adherence to substrates while maintaining good selectivity and permeance to a molecule of interest.

SUMMARY

A separation membrane comprises: a surface functionalized substrate porous to a molecule of interest; and, a film of a crosslinked composite deposited on the substrate, the composite comprising 60-99.999 wt % of graphene oxide (GO) and 0.001-40 wt % of an aldehyde-modified cellulose nanomaterial (ACN), all weight percentages based on weight sum of the GO and the ACN.

In a process for producing the separation membrane, the process comprises: depositing an uncrosslinked composite comprising the graphene oxide (GO) and the aldehyde-modified cellulose nanomaterial (ACN) on a functionalized surface of the surface functionalized substrate to form a film of the uncrosslinked composite on the substrate; and, crosslinking the composite to form the film of the crosslinked composite on the substrate.

An ink composition comprises 60-99.999 wt % of graphene oxide (GO) and 0.001-40 wt % of an aldehyde-modified cellulose nanomaterial (ACN) dispersed in an aqueous medium, an alcohol or a mixture thereof, all weight percentages based on weight sum of the GO and the ACN.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1:
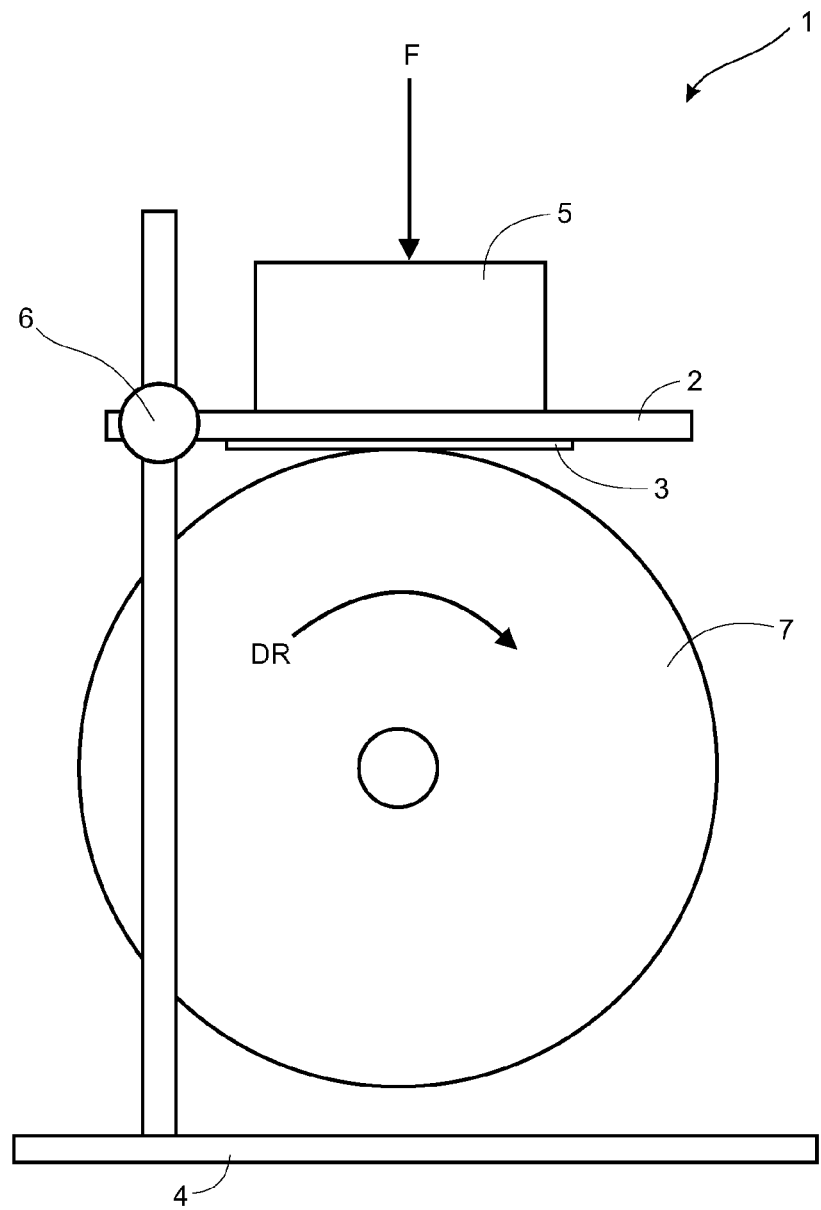
FIG. 1 depicts a schematic diagram of an abrasion wheel apparatus used to measure the abrasion resistance of membranes.

Herein is described a system that provides separation membranes having improved abrasion resistance and adherence to substrates for use in separation applications, especially water pervaporation applications. The system preferably involves interleaving high aspect ratio, rod-like aldehyde-modified cellulose nanomaterials between graphene oxide sheets and utilizing crosslinkers to create a dense, crosslinked network that is highly permeable and selective to a molecule of interest, especially water and water vapor, and does not delaminate in water. The crosslinking between GO and ACN prevents the membrane from delaminating when immersed in water and adds abrasion resistance while not impacting water vapor permeance through the membrane. The separation membranes retain high water and water vapor permeance preserving water vapor permeance above 7.0×10$^{-6}$ mol/s/m$^2$/Pa, and do not swell/delaminate in water. This system, especially when combined with oxidative surface treatment of a membrane support substrate, leads to improved adhesion of the membrane on the substrate. Cross-linking the graphene oxide directly improves abrasion resistance of the membrane, coating the GO on a non-swellable high surface energy substrate even further improves abrasion resistance, and utilizing an aldehyde modified cellulose nanomaterial yet further improves abrasion resistance of the membrane. Further, the membrane may act as a size-exclusion membrane, rejecting anything larger than a water molecule. In some embodiments, the membrane rejects particles 1 micrometer and larger in diameter (e.g., bacteria).

The separation membrane comprises a substrate porous to a molecule of interest; and, a film of a crosslinked graphene oxide (GO) and aldehyde-modified cellulose nanomaterial (ACN) composite deposited on the substrate.

The composite comprises a mixture of a graphene oxide (GO) and an aldehyde-modified cellulose nanomaterial (ACN). The mass of GO in the composite is greater than the mass of the ACN. The GO is present in the composite in an amount of at least 60 wt %, preferably at least 70 wt %, more preferably at least 75 wt %, even more preferably at least 80 wt %, even more preferably at least 85 wt %, based on the weight sum of the GO and ACN. The ACN is present in the composite in an amount of 40 wt % or less, preferably 30 wt % or less, more preferably 25 wt % or less, even more preferably 20 wt % or less, even more preferably 15 wt % or less, based on the weight sum of the GO and ACN. Preferably, the amount of GO is in a range of 60-99.999 wt %. Preferably, the amount of ACN is in a range of 0.001-40 wt %. In some embodiments, the amount of GO is in a range of 80-95 with % and the amount of ACN is in a range of 5-20 wt %. In some embodiments, the amount of GO is in a range of 85-95 with % and the amount of ACN is in a range of 5-15 wt %. The presence of 60 wt % or more of the GO in the GO-ACN composite imparts better selectivity to the molecule of interest in comparison to prior art CNF-GO systems (e.g., US 2021/178337) where the amount of GO is lower.

Graphene oxide (GO) is an electrically insulating material composed of a single graphene sheet with oxygen functional groups bonded as epoxy groups to the graphene basal-plane and carboxyl groups and hydroxyl groups bonded to the edge of the sides of the GO sheets. Graphene oxide (GO) can be obtained from the exfoliation of graphite oxide or during the the process of graphite oxidation which is used to make graphite oxide or graphene oxide by known methods. Single layers of GO are comprised of hexagonally arranged carbon atoms bonded non-stochiometrically on top and bottom to various oxygen-containing functional groups such as hydroxyls and epoxides typically with a C/O of approximately 2. When dispersed, these sheets possess a high surface-to-volume ratio. In addition, GO forms a stable aqueous suspension due to the presence of the carboxylic acid groups and phenolic hydroxyl groups on the edge of the side of GO sheets. The carboxyl, hydroxyl and/or epoxy moieties are available for condensation reactions with appropriate reactive molecules.

The aldehyde-modified cellulose nanomaterial (ACN) plays an important role in improving properties of the membrane. The ACN possesses aldehyde functional groups that are available for a condensation reaction with appropriate reactive molecules. Aldehyde modification of a cellulose material may be accomplished in any suitable manner. For example, aldehyde modification may be accomplished by oxidation of carbon-carbon bonds between adjacent hydroxyl groups in the pyranose ring of the cellulose material. In one embodiment, sodium periodate oxidation of the carbon-carbon bond results in the formation of two aldehyde groups that are reactive in condensation reactions. The carbon atom at the carbon-oxygen double-bond of the aldehyde moiety is an electrophile, which can react with nucleophiles. The aldehyde-modified cellulose nanomaterial (ACN) may be based on a native cellulose material or a synthetic cellulose material comprising a polymer derived from a native cellulose material. The native cellulose material may originate from any source such as plants (e.g., softwood plants, hardwood plants, other plants), tunicates, bacteria or combinations thereof. The ACN has at least one dimension (e.g., width or both width and length) that is less than 1000 nm in size, preferably 1-500 nm, more preferably 1-100 nm, yet more preferably 2-75 nm. The ACN may be in any form, for example nanofibers or nanocrystals. Cellulose nanofibers are preferred. Cellulose nanofibers (CNF) are fibrillar structures comprising high aspect ratio rod-like fibers with a typical diameter of 2 to 50 nanometers and a wide range of lengths up to 1 mm, preferably up to 500 microns. The CNF preferably have length-to-diameter aspect ratio of at least 10:1, or at least 50:1 or at least 100:1, or at least 500:1. The length-to-diameter aspect ratio is preferably in a range of 10:1 to 10,000:1, more preferably in a range of 100:1 to 1,000:1.

The composite is crosslinked using a crosslinker. The carbon atom at a carbon-oxygen bond is an electrophile, which can react with a nucleophile. Since both the graphene oxide (GO) and the aldehyde-modified cellulose nanomaterial (ACN) possess such carbon atoms, an appropriately functionalized nucleophile can be used as a crosslinker to crosslink the graphene oxide (GO), crosslink the aldehyde-modified cellulose nanomaterial (ACN) and crosslink the GO to the ACN. Thus, the crosslinker comprises a reactive functional molecule that has one or more functional groups appropriate for a condensation reaction with the aldehyde moiety on the ACN and one or more of the carboxyl, hydroxyl and epoxy moieties on the GO. The functional groups on the crosslinker are preferably primary amine groups, hydrazide groups, sulfhydryl groups or combinations thereof. The crosslinker is preferably a diamine, a dihydrazide or a dithiol. The crosslinker may be a small molecule, for example an organic molecule having 1-15 carbon atoms, preferably 2-8 carbon atoms. The crosslinker may be a macromolecule having more than 15 carbon atoms, for example an oligomer or a polymer. A mixture of crosslinkers may be utilized. Where C=N bonds are formed with the crosslinker, the C=N bonds may be stabilized with a reducing agent to further stabilize the crosslinking. The crosslinker is preferably used in the crosslinking reaction in a mass ratio of crosslinker to graphene oxide of at least 3:10, more preferably in a range of 3:10 to 14:10.

Some examples of amine crosslinkers are 1,2-ethylenediamine, 1,3-propanediamine, 1,4-butanediamine, 1,5-pentanediamine, 1,6-hexanediamine, 1,8-octanediamine, 1,9-nonanediamine, 1,10-decaniediamine, 1,11-undecanediamine, 1,12-dodecanediamine, triethylamine, triethylenetetramine, poly(ethylene glycol) diamine, 2,2'-(ethylenedioxy)bis(ethylamine), O,O'-bis(3-aminopropyl) diethylene glycol, poly(ethylene glycol) bis(3-aminopropyl) terminated, $NH_2$-PEG4-$NH_2$ and polydopamine. Some examples of hydrazide crosslinkers are dihydrazide sulfoxide, adipic acid dihydrazide, succinic dihydrazide, carbohydrazide, pimelic acid dihydrazide, isophthalic acid dihydrazide and oxalyldihydrazide. Some examples of thiol crosslinkers are ethane-1,2-dithiol, propanedithiol, butanedithiol, pentanedithiol, hexanedithiol, octanedithiol, nonanedithiol, undecanedithiol, dithiobutylamine, benzenedithiol, (ethylenedioxy)diethanethiol, dimercaptostilbene, dithiothreitol, poly(ethylene glycol) dithiol, hexa(ethylene glycol) dithiol, tetra(ethylene glycol) dithiol, hexadecanedithiol, dithiothreitol, dimercaptosuccinic acid and dimercapto-1-propanesulfonic acid. The crosslinker is preferably an organic diamine having 1-15 carbon atoms, preferably 2-8 carbon atoms, especially 1,2-ethylenediamine.

The substrate preferably comprises an organic polymer. The organic polymer may comprise a homopolymer, a copolymer, a terpolymer, or a mixture thereof. The organic polymer may comprise amorphous or crystalline polymers. The organic polymer may comprise hydrophobic or hydrophilic polymers. The organic polymer may comprise linear, branched, star, cross-linked or dendritic polymers or mixtures thereof. The organic polymer may be a thermoplastic, thermoset and/or elastomeric polymers. A given organic polymer may be classifiable into more than one of the foregoing categories.

Thermoplastic or elastomeric organic polymers are preferred. Thermoplastic organic polymers are particularly preferred. Thermoplastic organic polymers possess significant elasticity at room temperature and become viscous liquid-like materials at a higher temperature, this change being reversible. Some thermoplastic polymers have molecular structures that make it impossible for the polymer to crystallize while other thermoplastic polymers are capable of becoming crystalline or, rather, semi-crystalline. The former are amorphous thermoplastics while the latter are crystalline thermoplastics. Some suitable thermoplastic polymers include, for example, olefinics (i.e., polyolefins), vinylics, styrenics, acrylonitrilics, acrylics, cellulosics, polyamides, thermoplastic polyesters, thermoplastic polycarbonates, polysulfones, polyimides, polyether/oxides, polyketones, fluoropolymers, copolymers thereof, or mixtures thereof.

Some suitable olefinics (i.e., polyolefins) include, for example, polyethylenes (e.g., LDPE, HDPE, LLDPE, UHMWPE, XLPE, copolymers of ethylene with another monomer (e.g., ethylene-propylene copolymer)), polypropylene, polybutylene, polymethylpentene, or mixtures thereof. Some suitable vinylics include, for example, polyvinylchloride, chlorinated polyvinylchloride, vinyl chloride-based copolymers, polyvinylidenechloride, polyvinylacetate, polyvinylalcohol, polyvinyl aldehydics (e.g., polyvinylacetal), polyvinylalkylethers, polyvinylpyrrolidone, polyvinylcarbazole, polyvinylpyridine, or mixtures thereof. Some suitable styrenics include, for example, polystyrene, polyparamethylstyrene, polyalphamethylstyrene, high impact polystyrene, styrene-based copolymers, or mixtures thereof. Some suitable acrylonitrilics include, for example, polyacrylonitrile, polymethylacrylonitrile, acrylonitrle-based copolymers, or mixtures thereof. Some suitable acrylics include, for example, polyacrylic acid, polymethacrylic acid, polymethacrylate, polyethylacrylate, polybutylacrylate, polymethylmethacrylate, polyethylmethacrylate, cyanoacrylate resins, hydroxymethylmethacrylate, polacrylamide, or mixtures thereof. Some suitable cellulosics include, for example, cellulose, cellulose esters, cellulose acetates, mixed cellulosic organic esters, cellulose ethers, methylcellulose, ethylcellulose, carboxymethylcellulose, hydroxyethylcellulose, or mixtures thereof. Some suitable polyamides include, for example, aliphatic polyamides (i.e., nylons), aromatic polyamides, transparent polyamides, or mixtures thereof. Some suitable thermoplastic polyesters/polycarbonates are, for example, polyalkylene terephthalates (e.g., polyethylene terephthalate, polybutylene terephthalate), polycyclohexanedimethanol terephthalates, polyarylesters (e.g., polyarylates), polycarbonate, or mixtures thereof. Some suitable polysulfones include, for example, diphenylsulfone, polybisphenolsulfone, polyethersulfone, polyphenylethersulfones, or mixtures thereof. Some suitable polyimides include, for example, polyamideimide, polyetherimide, or mixtures thereof. Some suitable polyether/oxides include, for example, polymethyleneoxides, polyethyleneoxide, polypropyleneoxide, polyphenyleneoxides, or mixtures thereof. Some suitable polyketones include, for example, polyetheretherketone-1. Some suitable fluoropolymers include, for example, polytetrafluoroethylene, polychlorotrifluoroethylene, polyvinylfluoride, polyvinylidenefluoride, polyperfluoroalkoxy, polyhexafluoropropylene, polyhexafluoroisobutylene, fluoroplastic copolymers, or mixtures thereof.

Preferred examples of organic polymers include polyamide, polyethylene, polyethylene terephthalate (PET), polypropylene (PP), polyacrylonitrile (PAN) polysulfone (PSU), polyethersulfone (PES), polyvinylidene difluoride (PVDF), mixed cellulosic organic ester, cellulose acetate, thermoplastic polycarbonate (PC), thermoplastic polyester (PETE) or combinations thereof. Of particular interest are organic polymers useful in water vapor separation applications.

In order to obtain the best adhesion of the composite film to the substrate, films and substrates that do not actively swell in the presence of water are preferred. To this end, olefinics are a preferred class of organic polymers for use as a substrate. Ultrahigh molecular weight porous polyethylene and porous polypropylene substrates are particularly preferred substrates.

The substrate is porous to a molecule of interest. Depending on the molecule of interest, the substrate contains pores having a minimum pore diameter to permit permeation of the molecule of interest through the substrate. The molecule of interest may be, for example, water, etc.

The surface functionalized substrate comprises oxygen-containing species. The oxygen-containing species may be intrinsic to the substrate itself or may be added to the surface of the substrate. Especially when the substrate is hydrophobic and the composite and/or a coating medium for the composite is hydrophilic, surface modification of the substrate can help to increase the surface energy of the substrate to enhance wetting and ultimately adhesion of the composite to the substrate. In particular, it has been found that surface oxidation of the substrate significantly enhances adhesion of the composite film to the substrate. Some suitable surface oxidation techniques include corona discharge (e.g., low-temperature corona discharge) and ozonation. Corona discharge was found to be especially useful for enhancing adhesion of the composite film to polyolefin substrates.

In the process for producing the separation membrane, the composite may be deposited on the substrate before or after the composite is crosslinked. However, depositing an uncrosslinked composite comprising the graphene oxide (GO) and the aldehyde-modified cellulose nanomaterial (ACN) on the substrate before crosslinking and then crosslinking the composite to form the film of the crosslinked composite leads to even better adhesion and abrasion resistance. Crosslinking the composite after the composite has been deposited on the substrate can lead to crosslinks between the composite and the substrate as well as crosslinks within the composite. The composite is preferably deposited on the substrate by depositing a dispersion (i.e., an ink) of the GO and ACN on the substrate and removing liquid components of the dispersion to form the film of the composite on the substrate. The liquid components of the dispersion may comprise any solvent suitable for ink compositions including water and organic solvents. When an organic solvent is used, polar organic solvents are preferred, more preferably protic polar organic solvents, for example alcohols such as ethanol or isopropanol. Preferably, the solvent comprises an aqueous medium, an alcohol or a mixture thereof, more preferably an alcohol.

In a particularly preferred and efficacious embodiment, the use of a small molecule ($C_1$-$C_8$) diamine, especially 1,2-ethylenediamine, crosslinker to crosslink the graphene oxide and the aldehyde-modified cellulose nanomaterial deposited as a film on a porous polyolefin substrate, especially a polyethylene substrate, whose surface was modified by corona discharge produces a membrane with significantly improved abrasion resistance and composite film adhesion (e.g., no swelling or delamination in water) while maintaining high water vapor permeance through the membrane and excellent selectivity to water and water vapor. The results are particularly evident when the GO and ACN are used in amounts of 85-95 wt % GO and 5-15 wt % ACN.

EXAMPLES

Materials and Methods
Method for Producing Graphene Oxide (GO)

Graphene oxide was prepared using an improved Hummers method based on a method described in Marcano, D C, et al. Improved Synthesis of Graphene Oxide. *ACS Nano* 2010, 4 (8), 4806-4814, the entire contents of which is herein incorporated by reference. In a typical synthesis, 360 mL of sulfuric acid (Sigma-Aldrich, 95-98%) was mixed with 40 mL of phosphoric acid (Sigma-Aldrich, extra pure, 85% solution in water) in a round bottom flask. Next, 18 g of potassium permanganate (Sigma-Aldrich) was carefully added to the acid mixture under stirring at room temperature. The flask containing the mixture was then heated up to about 40° C. using a mantle heater or in an oil bath using a hot plate. After stabilizing the temperature, 3 g of graphite (Alfa Aesar, −10 mesh, 99.9%) was added to the flask under stirring. Next, the temperature was increased to 45-50° C., and the mixture was left under stirring for 16 h. After 16 hours of reaction, the mixture was cooled down to room temperature and slowly transferred into a large beaker filled with 400 g of ice. Once the mixture cooled down to room temperature, the mixture was quenched by the addition of 7 mL hydrogen peroxide (Sigma-Aldrich, 30%) which results in a change of color from dark brown to golden.

Using a centrifugation step, the GO was separated from the acidic mixture. To further purify the GO, the GO was subjected to a few rounds of centrifugation, redispersion in 10% HCl (Sigma-Aldrich), followed by a few more rounds of centrifugation and redispersion in ethanol (Fisher Scientific) to eliminate remaining reaction residues and impurities. The ethanolic paste of GO was stored in a sealed glass jar in dark.

Method for Producing Aldehyde-Modified Cellulose Nanomaterials (ACN)

To modify the surface of nanocellulose a sodium periodate mediated oxidation method was used to cleave the C2-C3 bond in the pyranose ring of the cellulose unit resulting in the conversion of secondary alcohol to dialdehyde groups on the surface of the nanocellulose. Sodium periodate mediated oxidation can also be used to introduce aldehyde (reactive carbonyl) groups to polysaccharides and other sugar-containing macromolecules such as carbohydrates or glycoproteins. Sodium periodate mediated oxidation methods are described in the following references, the entire contents of all of which are incorporated herein by reference: Periodate Oxidation of Crystalline Cellulose: *Biomacromolecules* 2000, 1, 488-492; Improving the mechanical and thermal properties of gelatin hydrogels cross-linked by cellulose nanowhiskers, http://dx.doi.org/10.1016/j.carbpol.2012.08.080; Sodium periodate oxidation of cellulose nanocrystal and its application as a paper wet strength additive, Bo Sun, et al., DOI 10.1007/s10570-015-0575-5).

In a typical procedure, a highly concentrated cellulose nanomaterial (CN) paste was diluted in deionized water to obtain dilute dispersions of 1-5 wt % of the CN. To this dispersion, sodium periodate was added to achieve a final CN to sodium periodate weight ratio of 1:4. The mixture was left under stirring at 22° C. in dark for 24 hours. The reaction was quenched with the addition of ethylene glycol and the final product was purified by dialysis against deionized water for 5 days using cellulose membrane (Sigma; MWCO: 14000 Da). The aldehyde-modified cellulose nanomaterials (ACNs) were collected using centrifugation by 2870 RCF for 30 minutes and redispersed in ethanol.

Cellulose nanofibers (CNF) and cellulose nanocrystals (CNC) were used to produce aldehyde-modified cellulose nanofibers (ACNF) and produce aldehyde-modified cellulose nanocrystals (ACNC). CNFs were acquired from the University of Maine with nominal fiber width of 50 nm and lengths of up to several hundred microns. The CNFs have a hydrophilic surface with 31-33 $m^2/g$ surface area determined by BET method (Brunauer-Emmett-Teller) CNCs were acquired from CelluForce Inc., and have diameters in the range of 10-20 nm and lengths of a few hundred nanometers.

Preparation of GO/ACN Suspension (Composite Ink)

For preparation an ink, concentrated GO paste was mixed with ethanol (EtOH) or water to form a mixture of 8 mg/mL GO, and was dispersed via probe sonication for 8 minutes to form a suspension. In a separate container, ACN as mixed with ethanol or water at a certain concentration to reach 0.8 mg/mL, and agitated by hand to disperse the ACN. The two mixtures were combined at a 1:1 V:V ratio and dispersed further via probe sonication for 30 seconds to form an ink. The final ink composition contained 90 wt % GO and 10 wt % ACN based on the sum of the weights of the GO and ACN.

Pre-Treatment of Porous Polyethylene (PE) Substrate to Oxidize the Surface of the PE Prior to coating, the substrate was secured in place and a corona treatment wand held ⅛" above the surface of the substrate was moved across the surface at a linear speed of 1 cm/s for four passes. The resulting surface modification changes the water contact angle on the surface from 105 degrees to 55 degrees. For pre-treatment via ozone, substrate samples were kept in ozone box for period of 20 minutes before being used.

Preparation of Membrane Via Casting

Coating the substrate with the composite ink was accomplished by the casting method described in United States patent application U.S. Ser. No. 63/227,594 filed Jul. 30, 2021, the entire contents of which is herein incorporated by reference. In a typical membrane casting procedure, the porous substrate was secured over a porous ceramic slab. A reduced pressure environment was created underneath the porous ceramic slab and porous substrate with the aid of a vacuum pump, with the vacuum being finely controlled via a needle valve. A doctor blade was moved to the front of the substrate in-front of the ink dispenser, with the blade gap being adjusted to the desired height (i.e., 200 um). The composite ink was dispensed over the secured porous substrate, meanwhile the blade is moved over the dispensed ink at a speed of 0.4 inch/s to create a thin liquid film. At the same time, the dispensed liquid passes through the porous substrate and support due to the low pressure generated by the vacuum. After the majority of the liquid was collected, the GO/ACN coated substrate was removed by the porous ceramic slab and heated in an oven to remove the residual solvent.

Method for Crosslinking Coated Substrate

Following coating and drying, the membrane was cut into a rectangle measuring 76 mm×58 mm and placed in a 100 mm diameter crystallization dish. A solution containing 30 mL of solvent (water or ethanol, enough to immerse the membrane fully) and crosslinker (ethylenediamine (EDA)) was added in a mass basis relative to the amount of GO present, usually from 2:10 to 13.33:10 EDA:GO. For adding small amounts of crosslinker, EDA was mixed with ethanol in 1:3 volume ratio and added via autopipette. The membrane remained in the solvent for a period of 1 hour, after which the membrane was rinsed with solvent to remove residual crosslinker. The membrane was dried by exposure to the atmosphere.

Method for Testing Water Permeance

The water vapor permeance for the membrane is defined as the molar flow rate across the membrane per unit area per unit pressure (with pressure defined as the transmembrane water vapor partial pressure). To quantify this value, as prepared GO and ACNF/GO membranes were inserted into a custom-made system where liquid water was passed across one side, and humid air with a relative humidity of 50-52% RH swept across the other side (sweep gas). Using this test cell, the water vapor permeance of the GO and ACNF/GO membranes can be calculated using:

$$\text{Perm}_{water} = \frac{n}{A \times \Delta P_{water}}$$

where $\text{Perm}_{water}$ represents the water vapor permeance of the GO or ACNF:GO or ACNC:GO coated membrane (mol·s$^{-1}$·m$^{-2}$·Pa$^{-1}$), n represents the molar flowrate of water vapor across the membrane (mol/s), A is the active area of membrane in the test cell (m$^2$), and $\Delta P_{water}$ is the transmembrane water vapor partial pressure, which is estimated using the following equations:

$$\Delta P_{water} = \frac{\Delta P_a - \Delta P_b}{\ln \Delta P_a - \ln \Delta P_b}$$

$$\Delta P_a = P_{0,water}(T_w) - [RH_{in} * P_{0,water}(T_{in})]$$

$$\Delta P_b = P_{0,water}(T_w) - [RH_{out} * P_{0,water}(T_{out})]$$

$$P_{0,water}(T) = 0.61121 \times \exp\left[\left(18.678 - \frac{T}{234.5}\right) \times \left(\frac{T}{234.5 + T}\right)\right]$$

where $P_{0,water}(T)$ represents the saturated vapor pressure of water at temperature T (in the last equation, T is in °C.), $RH_{in}$ and $T_{in}$ are relative humidity and temperature of the sweep gas inlet respectively, $RH_{out}$ and $T_{out}$ are relative humidity and temperature of the sweep gas out let, respectively, and $T_w$ is the temperature of the liquid water (which holds a near-constant temperature in this custom-made system).

Method for Measuring Abrasion Resistance

Abrasion resistance of the membranes was measured in an abrasion wheel apparatus 1 (see FIG. 1) akin to ASTM standard G195-13a. The apparatus 1 comprises an abrasion wheel 7 rotatable in an angular direction of rotation DR beneath a sample membrane 3 affixed to an underside of a sample platform 2. A weight 5 is placed on the sample platform 2 to provide a constant force F on the sample membrane 3, which is between the weight 5 and the abrasion wheel 7. The sample platform 2 is connected to a support stand 4 by a sample platform anchor 6. A set amount of work was delivered to the sample membrane 3 by the abrasion wheel 7 and image analysis was used to determine the amount of material abraded off the sample membrane 3. However, depending on the type of sample membrane 3 being tested, either the LOW settings were used or the HIGH settings were used as shown in Table 1. In both settings, the sample membrane 3 was soaked in water for a predetermined time, placed between the weight 5 of known mass and the abrasion wheel 7 with abrasive material (a buffing wheel), and the abrasion wheel 7 was rotated at a set speed for a set period of time, thereby allowing for calculation of applied work. Then, the abrasion wheel 7 was operated for a longer period of time to abrade the entire surface of the sample membrane 3, which was deemed as destruction and the total amount of the sample membrane 3 that could be removed. Then, before and after photos of the sample membrane 3 were processed using an image analysis technique (ImageJ) to determine the amount of area removed by the abrasive technique. The relevant equations for calculating work, distance and force are:

$$W = F \times d$$

$$d = \omega \times r \times t$$

$$F = \mu \times m \times g \times \cos(\theta)$$

where W is the amount of work done to the sample (J), d is the distance covered by the abrasion wheel (m), ω is the angular velocity (rpm), r is the radius of the abrasion wheel (m), t is the abrasion time (s), μ is the coefficient of friction (taken as 1.0), m is the mass of the weight (kg), g is the gravitational constant (9.81 m/s$^2$), and θ is the contact angle from the horizontal (0°).

TABLE 1

| Property | LOW | HIGH |
|---|---|---|
| Soaking time (s) | 1 | 60 |
| ω(rpm) | 10 | 500 |
| r (m) | 0.08 | 0.08 |
| t (s) | 5 | 60 |
| m (kg) | 0.28 | 0.3 |
| Work (J) | 1.21 | 748 |

Example 1—Comparison of Crosslinked GO Coatings on Nylon™ Unmodified PE, Ozonated PE, and Corona Treated PE Membranes were produced in which an ink comprising 4 mg/mL of graphene oxide (GO) in ethanol were deposited on Nylon™, unmodified polyethylene (PE), ozonated polyethylene (OPE), and corona treated polyethylene (CPE) and then crosslinked with 1,2-ethylenediamine (EDA) using a mass ratio of EDA:GO of 6.67:10. Abrasion tests on the membranes were performed at the LOW setting. Nylon™ (PA66) was purchased from Membrane Solutions, having a thickness of 100-130 μm and pore size of 0.1 μm, PE was purchased from Entek LLC, having thickness of 12 and 25 μm and porosity of 54%.

Figure 2:
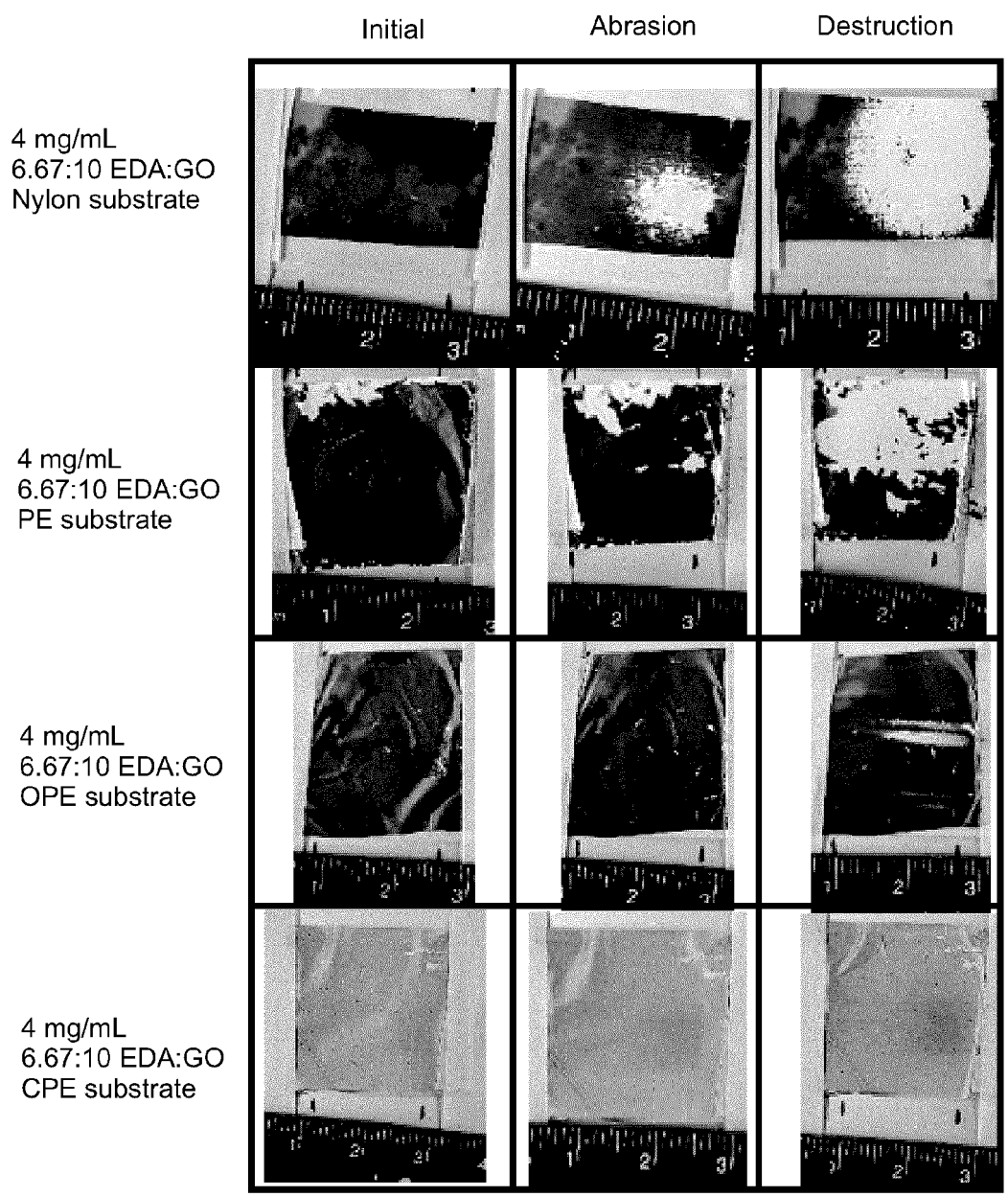
FIG. 2 depicts optical images of membranes comprising EDA crosslinked GO films deposited on various substrates initially, after abrasion and after destructive abrasion, where the substrates are Nylon™, unmodified polyethylene (PE), ozonated polyethylene (OPE), and corona treated polyethylene (CPE).
Figure 3:
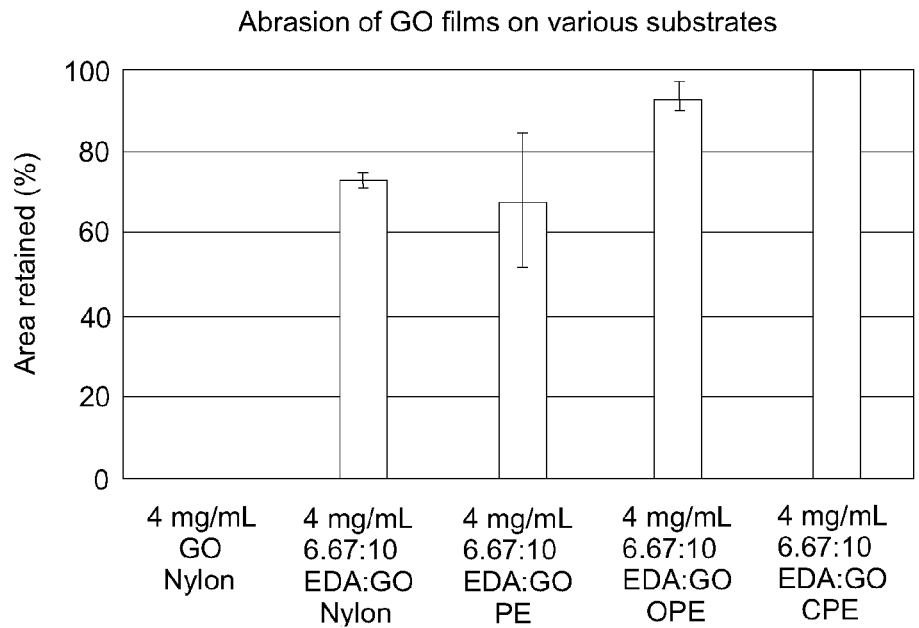
FIG. 3 depicts a graph of abrasion resistance (% area retained) at LOW setting for the crosslinked GO membranes of FIG. 2 compared to a membrane comprising an uncrosslinked GO film on Nylon™.

FIG. 2 and FIG. 3 show the effect of LOW abrasion on the GO films cast on the various substrates. Uncrosslinked GO on Nylon™ (not pictured in FIG. 2) is unable to withstand the initial water soak for the wet abrasion test, whereas crosslinking leads to improved abrasion resistance. Further, comparing EDA-GO on unmodified PE to EDA-GO on Nylon™, it is evident that a hydrophilic substrate is desirable for better abrasion resistance. Thus, further improving the surface hydrophilicity of PE through ozonation and corona treatment results in greater abrasion resistance than unmodified PE, and surprisingly results in even greater abrasion resistance than Nylon™-based membrane. It is remarkable that the corona treated PE (CPE) did not suffer any abrasion at the LOW setting.

Figure 4:
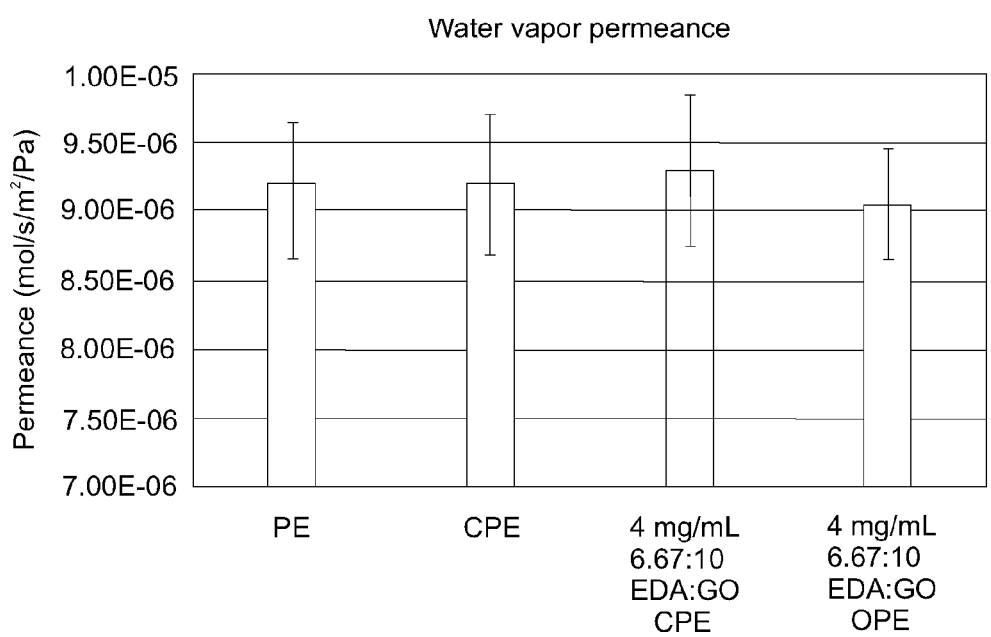
FIG. 4 depicts a graph of water vapor permeance $(mol \cdot s^{-1} \cdot m^{-2} \cdot Pa^{-1})$ comparing membranes comprising EDA crosslinked GO films deposited on CPE and OPE to bare PE and CPE substrates.

FIG. 4 demonstrates the impact of the membranes having crosslinked GO films on water permeance through the PE-based, CPE-based and OPE-based membranes (12 μm thickness). It can be seen that within error, the 4 mg/mL 6.67:10 EDA:GO coating does not unduly impact water vapor permeance. Thus, EDA crosslinked GO films on PE substrates provide an effective abrasion-resistant coating without unduly impacting water permeance.

Example 2—Effect of Amount of Crosslinker on Water Vapor Permeance

Figure 5:
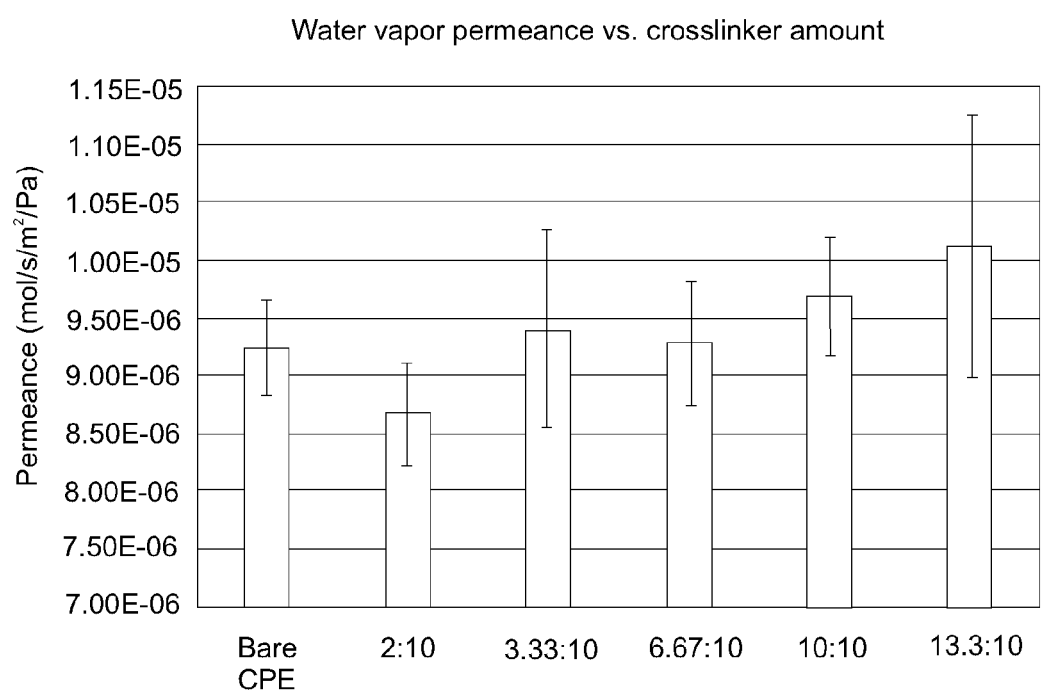
FIG. 5 depicts a graph of water vapor permeance $(mol \cdot s^{-1} \cdot m^{-2} \cdot Pa^{-1})$ comparing membranes comprising GO films crosslinked with various amounts of EDA on non-surface functionalized PE to bare corona discharge treated PE (CPE).

The relative amount of crosslinker to graphene oxide was investigated to determine how the amount of crosslinker affects water vapor permeance through the substrate. Water vapor permeance measurements were made on a corona discharge-treated polyethylene (CPE) substrate (12 μm thickness), as well as on membranes prepared on CPE substrates from inks having 4 mg/mL GO in ethanol deposited on the substrate and crosslinked with EDA at amounts of 2:10, 3.33:10, 6.67:10, 10:10, and 13.3:10 EDA:GO mass basis. As seen in FIG. 5, amounts of EDA greater than 2:10 EDA:GO mass basis leads to the same or greater observed water vapor permeance compared to bare corona treated PE. Thus, using any crosslinker in a crosslinker:GO mass ratio of 3:10 or greater should yield desirable water vapor permeance properties.

Example 3—Membranes with Crosslinked GO-ACN Films

Membranes were produced in which an ink comprising 4 mg/mL of graphene oxide (GO) and 0.44 mg/mL of either ACNF or ACNC in ethanol or water were deposited on corona treated polyethylene (CPE) and then crosslinked with 1,2-ethylenediamine (EDA) using a mass ratio of EDA:GO of 6.67:10. Abrasion tests on the membranes were performed at the HIGH setting.

Figure 6:
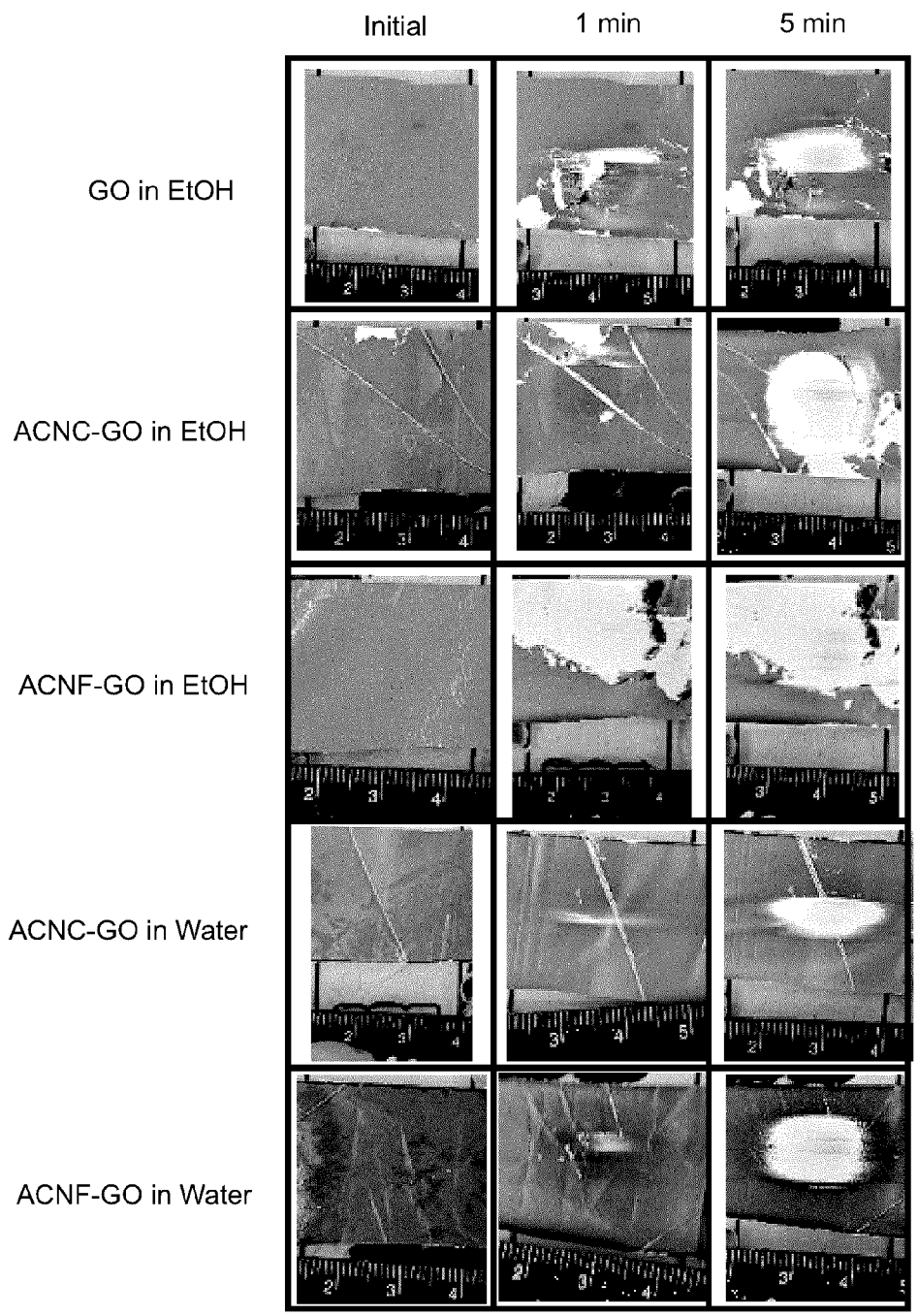
FIG. 6 depicts optical images of membranes comprising GO, ACNC-GO and ACNF-GO films on CPE substrate, where the GO, ACNC-GO and ACNF-GO films are crosslinked with EDA at mass ratio of 6.67:10 EDA:GO in ethanol and water initially, after 1 minute HIGH abrasion and after 5 minutes HIGH abrasion.
Figure 7:
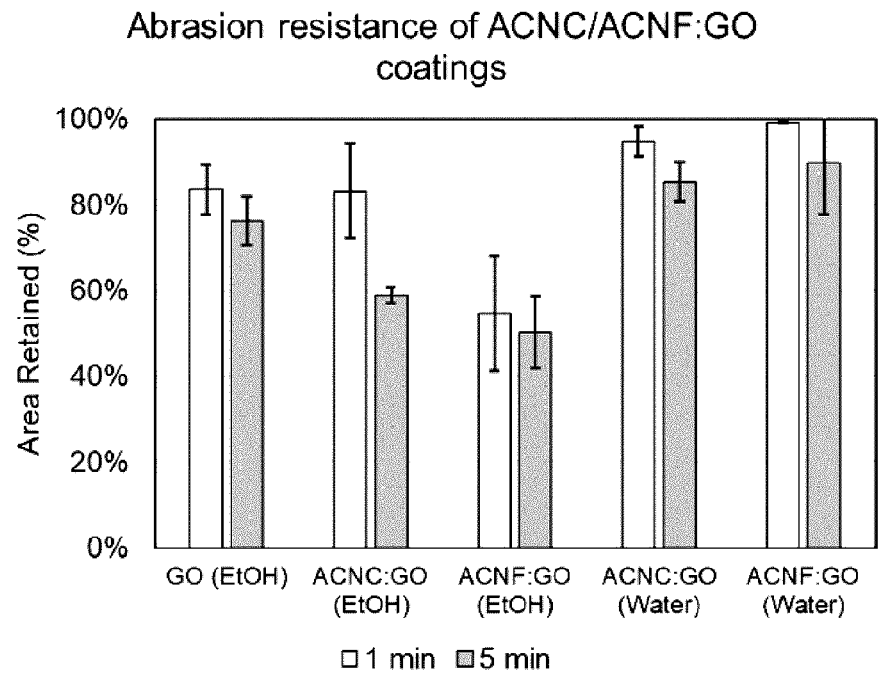
FIG. 7 depicts a graph of abrasion resistance (% area retained) at HIGH setting for the crosslinked GO membranes of FIG. 6.

FIG. 6 and FIG. 7 show the results of abrasion resistance testing for a crosslinked GO membrane (6.67:10 EDA:GO), as well as 1:9 ACNC:GO and 1:9 ACNF:GO mass basis membranes (crosslinked with 6.67:10 EDA:GO mass basis in both ethanol and water for 1 hour). Abrasion tests were conducted at HIGH conditions due to improved strength and adhesion of coatings to CPE substrate. The results highlight the impact of the addition of ACNCs and ACNFs into the membrane. When crosslinked in an aqueous medium (e.g., the GO and ACN film is immersed in water), the abrasion resistance properties are markedly improved over the crosslinked GO films. It is unexpected that the presence of ACNC and ACNF with the GO in an aqueous solution (preferentially to alcohol) leads to a composition that can be crosslinked by introducing EDA after a film is formed by a doctor blading technique. The crosslinked film has superior abrasion resistance and is resistant to flaking.

Figure 8:
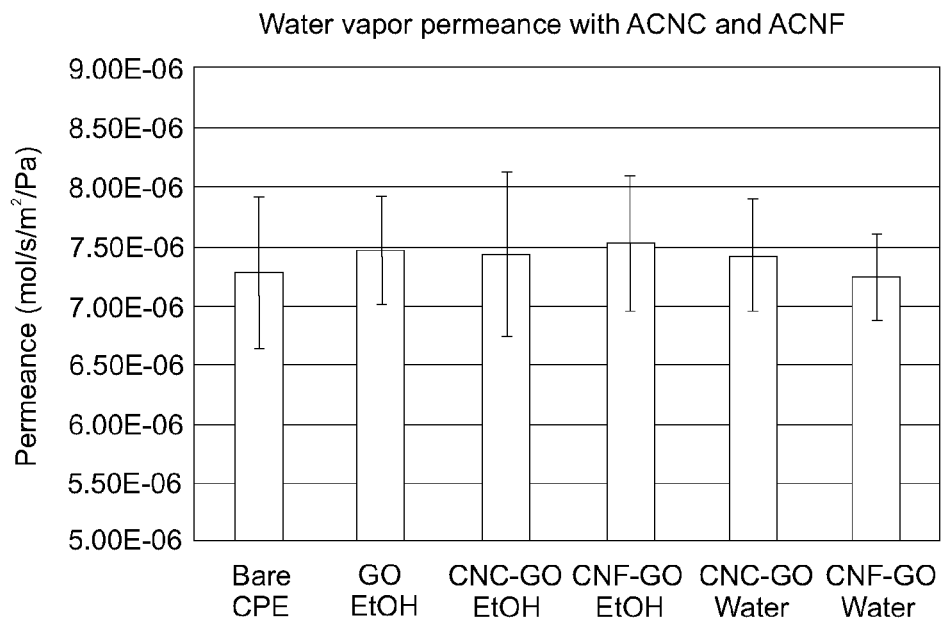
FIG. 8 depicts a graph of water vapor permeance (mol·s$^{-1}$·m$^{-2}$·Pa$^{-1}$) comparing bare CPE substrate to the crosslinked GO membranes of FIG. 6.

FIG. 8 shows the water vapor permeance of the same membranes discussed in FIG. 6 and FIG. 7. The substrates were 25 μm thick. FIG. 8 demonstrates that the water vapor permeance remains relatively unchanged with the addition of each combination of coating.

Example 4—Effect of Mass Concentration of GO on Water Permeance

Figure 9:
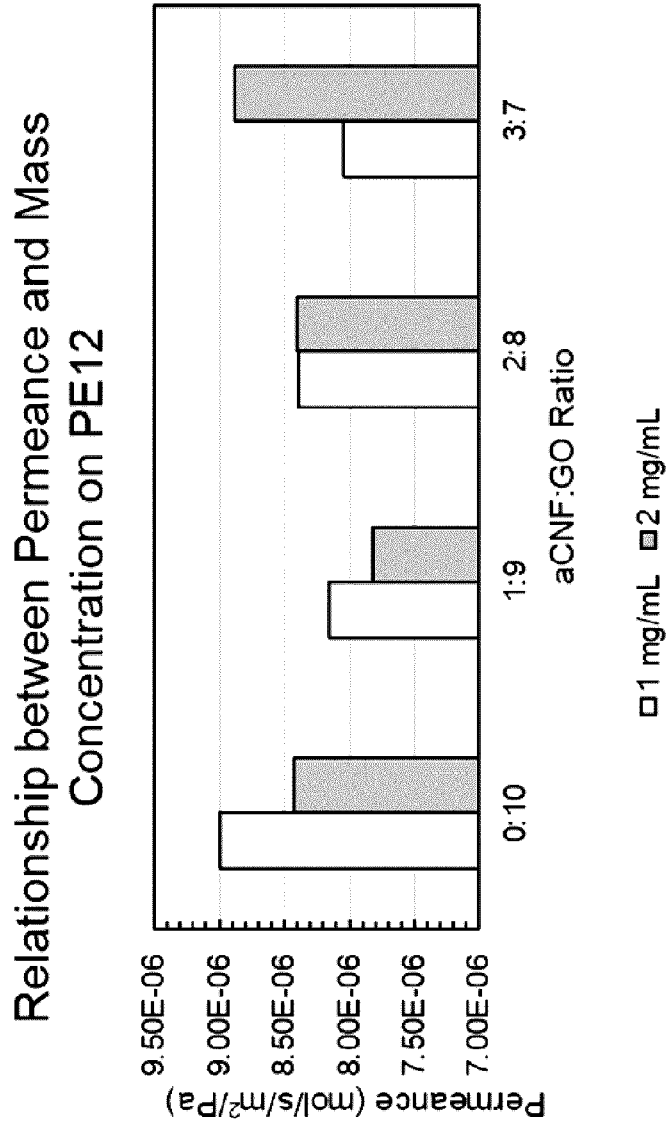
FIG. 9 depicts a graph of water vapor permeance (mol·s$^{-1}$·m$^{-2}$·Pa$^{-1}$) comparing pervaporation performance of membranes comprising films of GO and various ratios of ACNF-GO and made from inks comprising 1 mg/mL and 2 mg/mL of GO deposited on corona discharge-treated PE12 substrates to illustrate the relationship between permeance and mass concentration.

FIG. 9 shows the water permeance of membranes made using inks comprising 1 mg/mL and 2 mg/mL of graphene oxide when the membranes are used for pervaporation applications. Membranes deposited on corona discharge-treated polyethylene substrates (12 μm thickness) (PE12 substrates) were prepared similarly as described above using pure GO, as well as ACNF-GO composites at ACNF:GO weight ratios of 1:9, 2:8, and 3:7. FIG. 9 shows that increasing the ink concentration from 1 mg/mL to 2 mg/mL does not significantly affect the membrane permeance performance in pervaporation applications. Thus, using inks with lower concentrations of GO can result in materials and cost saving without sacrificing pervaporation performance.

Figure 10A:
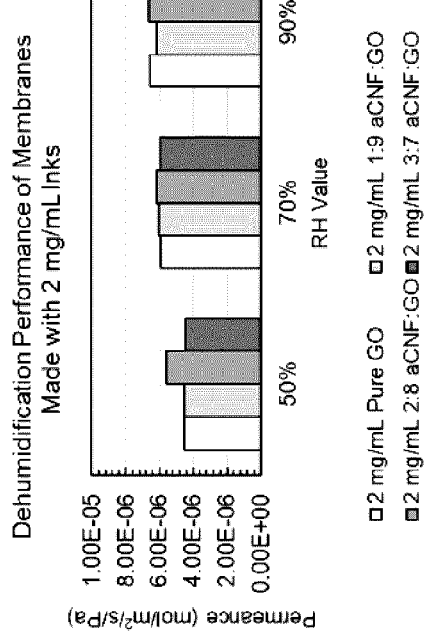
FIG. 10A depicts a graph of water vapor permeance (mol·s$^{-1}$·m$^{-2}$·Pa$^{-1}$) vs. relative humidity (RH, %) showing dehumidification performance of membranes comprising films of GO and various ratios of ACNF-GO and made from inks comprising 1 mg/mL of GO deposited on corona discharge-treated PE12 substrates.
Figure 10B:
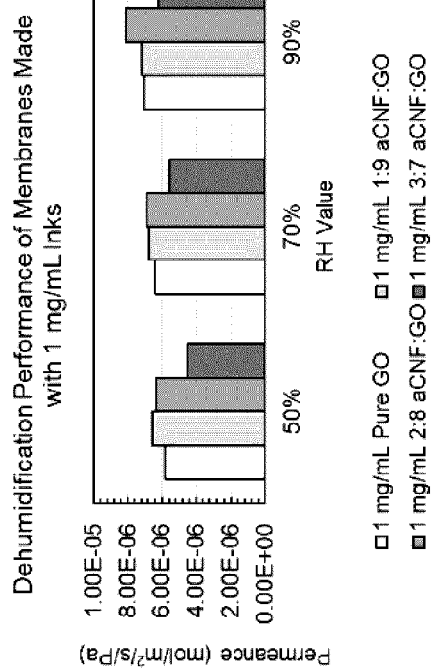
FIG. 10B depicts a graph of water vapor permeance (mol·s$^{-1}$·m$^{-2}$·Pa$^{-1}$) vs. relative humidity (RH, %) showing dehumidification performance of membranes comprising films of GO and various ratios of ACNF-GO and made from inks comprising 2 mg/mL of GO deposited on corona discharge-treated PE12 substrates.
Figure 10C:
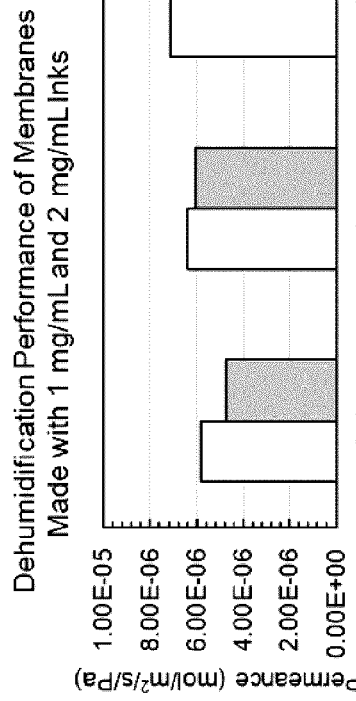
FIG. 10C depicts a graph of water vapor permeance (mol·s$^{-1}$·m$^{-2}$·Pa$^{-1}$) vs. relative humidity (RH, %) comparing average dehumidification performance of the membranes of FIG. 10A and FIG. 10B.

FIG. 10A, FIG. 10B and FIG. 10C show the permeance of the membranes tested in a dehumidification application with inlet air relative humidity (RH) of 50%, 70%, and 90%. FIG. 10A shows the permenence at each RH level for membranes made with inks comprising 1 mg/mL GO with the varied ACNF:GO ratios. Similarly, FIG. 10B shows the permanence at each RH level for the membranes made with inks comprising 2 mg/mL with the varied ACNF:GO ratios. FIG. 10A and FIG. 10B show that the ACNF:GO ratio does not significantly affect permeance of the membranes. FIG. 10C shows the average performance of all four membranes made with a given ink concentration at 50% RH, 70% RH, and 90% RH. At each level of relative humidity, the membranes made with inks comprising 1 mg/mL GO have higher permeance than their 2 mg/mL counterparts on average. Thus, using an ink comprising 1 mg/mL of GO instead of 2 mg/mL of GO leads to improved performance for dehumidification applications.

Example 5—Effect of ACN:GO Ratio on Water Permeance

Figure 11A:
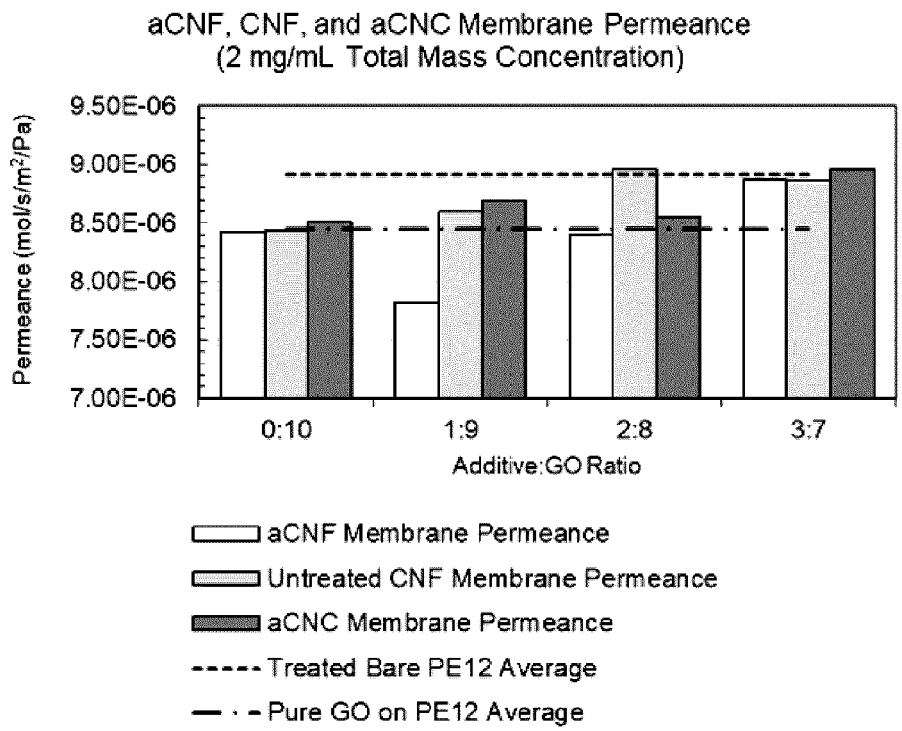
FIG. 11A depicts a graph of water vapor permeance (mol·s$^{-1}$·m$^{-2}$·Pa$^{-1}$) showing pervaporation performance of membranes comprising films made from inks comprising 2 mg/mL GO and containing various additives (ACNF, CNF, ACNC) with different additive:GO ratios deposited on corona discharge-treated PE12 substrates.
Figure 11B:
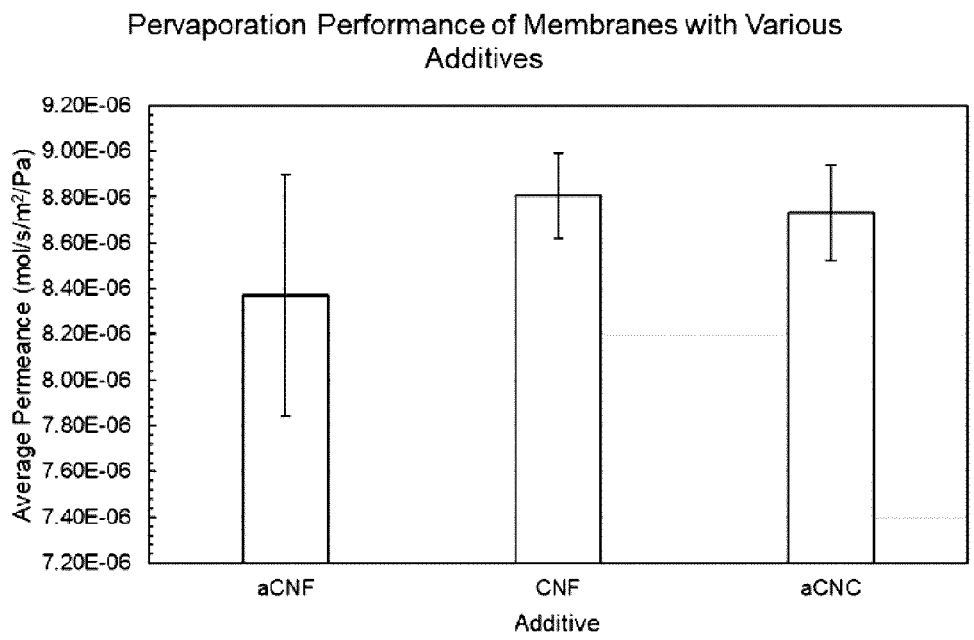
FIG. 11B depicts a graph of water vapor permeance (mol·s$^{-1}$·m$^{-2}$·Pa$^{-1}$) showing the average performance of the membranes of FIG. 11A, where error bars show the standard deviation of the samples with different additive:GO ratios used in finding the average.

The effect on water permeance of the relative amount of the aldehyde-modified cellulose nanomaterial (ACN) additives in the ACN-GO composites was examined. FIG. 11A and FIG. 11B show that membranes with CNF, ACNF and ACNC perform as well as pure GO membranes, with average permeance of the composite membranes comprising each additive falling within 5% of the permeance of pure GO. Thus, composite membranes comprising ACN in the range of at least 10-30 wt % can be used in pervaporation applications without significantly altering pervaporation performance of the membrane.

Figure 12B:
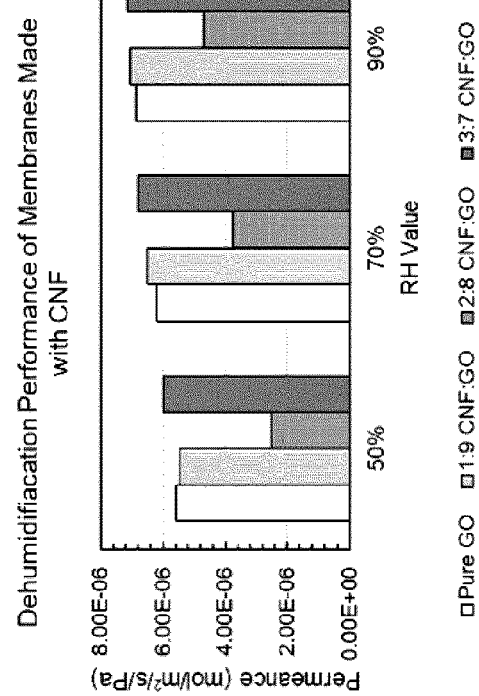
FIG. 12B depicts a graph of water vapor permeance (mol·s$^{-1}$·m$^{-2}$·Pa$^{-1}$) vs. relative humidity (RH, %) showing dehumidification performance of the membranes of FIG. 11A comprising films of CNF-GO, when tested in dehumidification applications with inlet air relative humidity of 50%, 70%, and 90%.
Figure 12D:
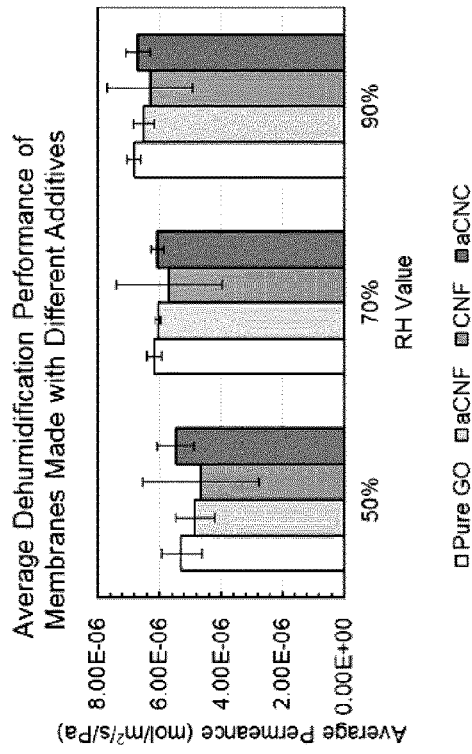
FIG. 12D depicts a graph of water vapor permeance (mol·s$^{-1}$·m$^{-2}$·Pa$^{-1}$) vs. relative humidity (RH, %) showing the average dehumidification performance of the membranes of FIG. 12C, FIG. 12B and FIG. 12C, where error bars show one standard deviation in each direction for each additive at a given RH.
Figure 12A:
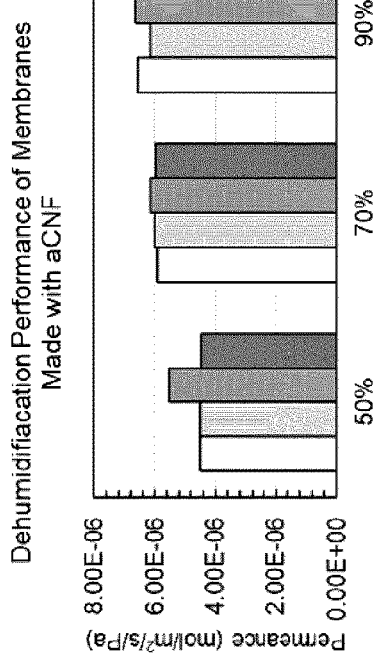
FIG. 12A depicts a graph of water vapor permeance (mol·s$^{-1}$·m$^{-2}$·Pa$^{-1}$) vs. relative humidity (RH, %) showing dehumidification performance of the membranes of FIG. 11A comprising films of ACNF-GO, when tested in dehumidification applications with inlet air relative humidity of 50%, 70%, and 90%.
Figure 12C:
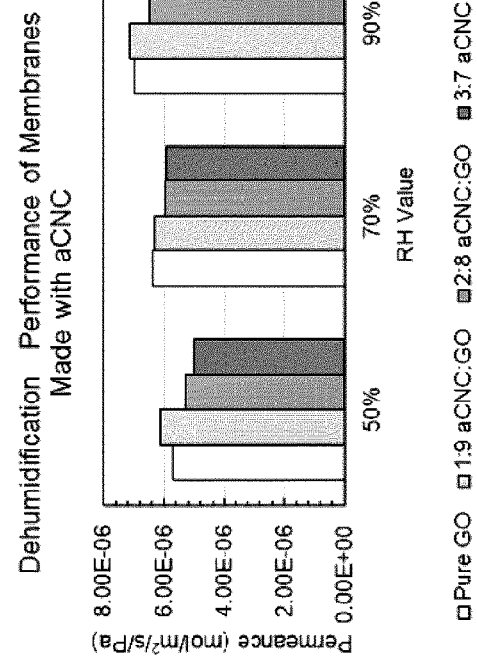
FIG. 12C depicts a graph of water vapor permeance (mol·s$^{-1}$·m$^{-2}$·Pa$^{-1}$) vs. relative humidity (RH, %) showing dehumidification performance of the membranes of FIG. 11A comprising films of ACNC-GO, when tested in dehumidification applications with inlet air relative humidity of 50%, 70%, and 90%.

FIG. 12A, FIG. 12B and FIG. 12C show that the relative amount of additive in the composite membrane, at least in a range of 10-30 wt %, does not significantly affect permeance for dehumidification applications. FIG. 12D shows the average permeance of the composite membranes made with each of the three additives, normalized to pure GO membranes at 50% RH, 70% RH, and 90% RH, respectively. From FIG. 12D it is evident that the composite membranes having different ratios of additive:GO all produce results similar to those of pure GO membranes. Thus, composite membranes comprising ACN in the range of at least 10-30 wt % can be used in dehumidification applications without significantly altering dehumidification performance of the membrane.

Example 6—Effect of Substrate on Water Permeance

Figure 13:
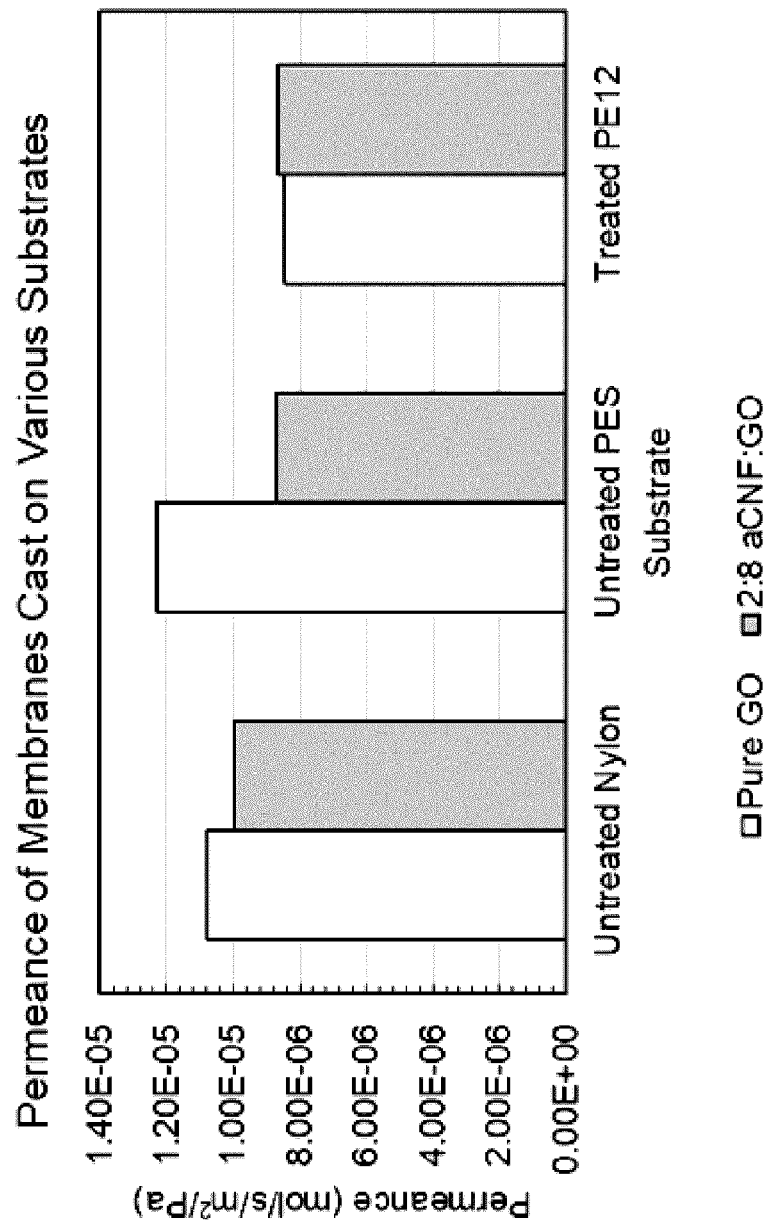
FIG. 13 depicts a graph of water vapor permeance (mol·s$^{-1}$·m$^{-2}$·Pa$^{-1}$) for membranes comprising films of GO and 2:8 ACNF-GO deposited on different substrates when used in a pervaporation application.

FIG. 13 shows that membranes in which films of GO and ACNF-GO are deposited on Nylon™ substrates perform well in pervaporation applications, with permeance higher than the permeance of membranes having the same films deposited on corona discharge-treated polyethylene substrates. Membranes comprising the films deposited on a polyethersulfone (PES) substrate showed significant variation, believed to be caused by swelling of the substrate and possible leaking, thus PES substrates are less ideal.

Example 7—Effect of Crosslinker Concentration on Water Permeance

Figure 14:
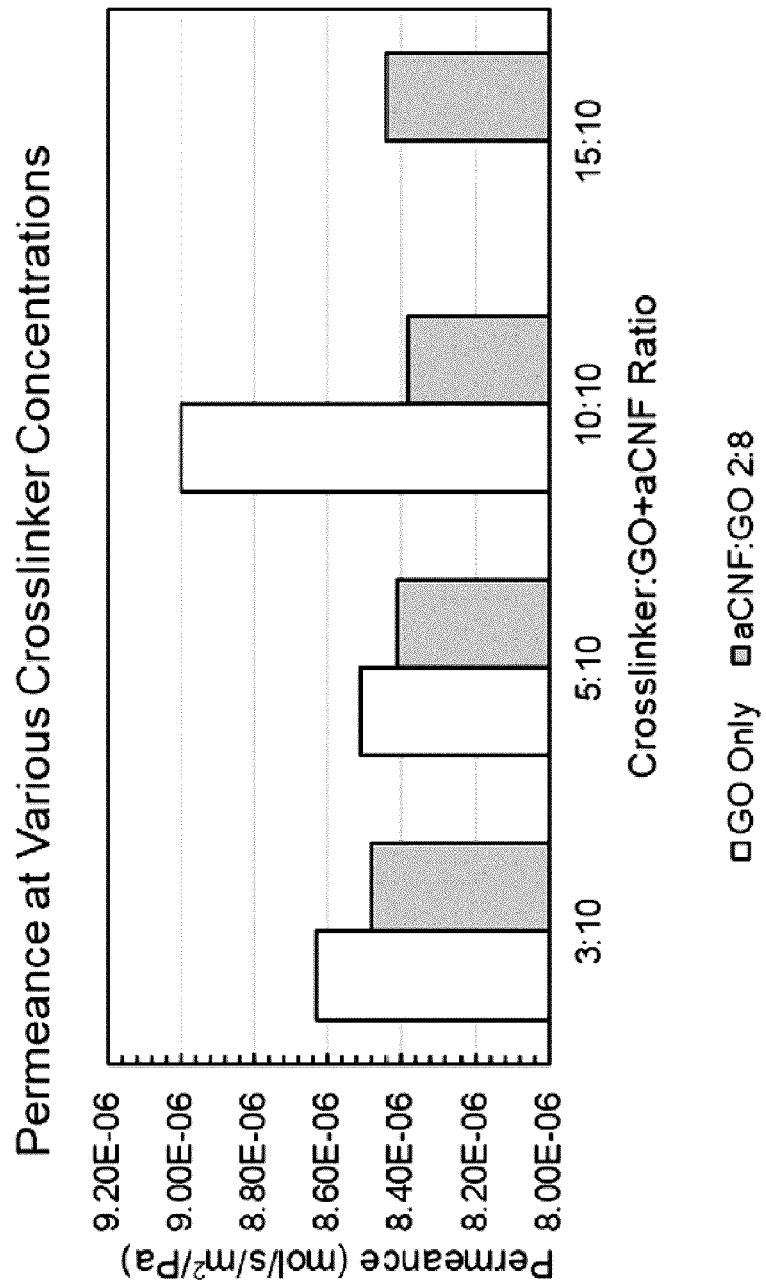
FIG. 14 depicts a graph of water vapor permeance (mol·s$^{-1}$·m$^{-2}$·Pa$^{-1}$) comparing pervaporation performance of membranes comprising films of GO and 2:8 ACNF-GO crosslinked with various concentrations of EDA and deposted on corona discharge-treated PE12 substrates, where mass of EDA:total mass of GO and aCNF were in ratios of 3:10, 5:10, 10:10 and 15:10.
Figure 15A:
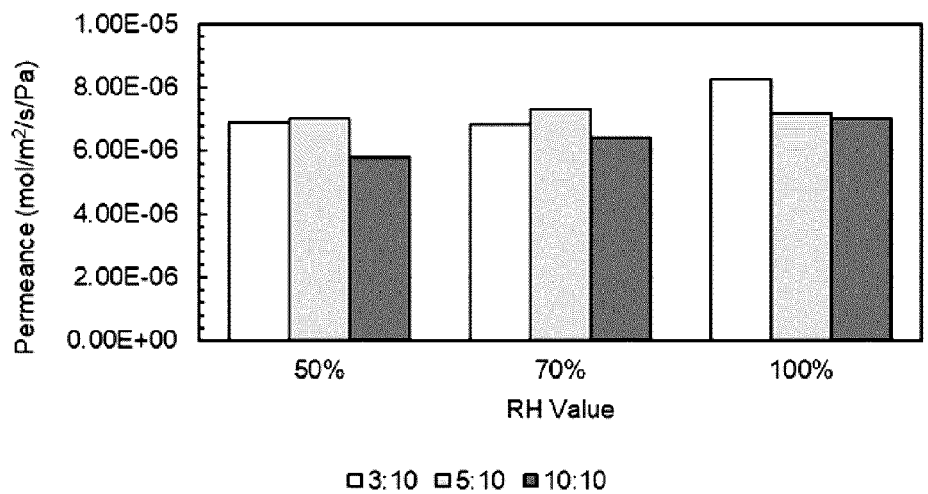
FIG. 15A depicts a graph of water vapor permeance (mol·s$^{-1}$·m$^{-2}$·Pa$^{-1}$) vs. relative humidity (RH, %) showing dehumidification performance of membranes comprising films of pure GO crosslinked with various concentrations of EDA and deposited on corona discharge-treated PE12 substrates.
Figure 15B:
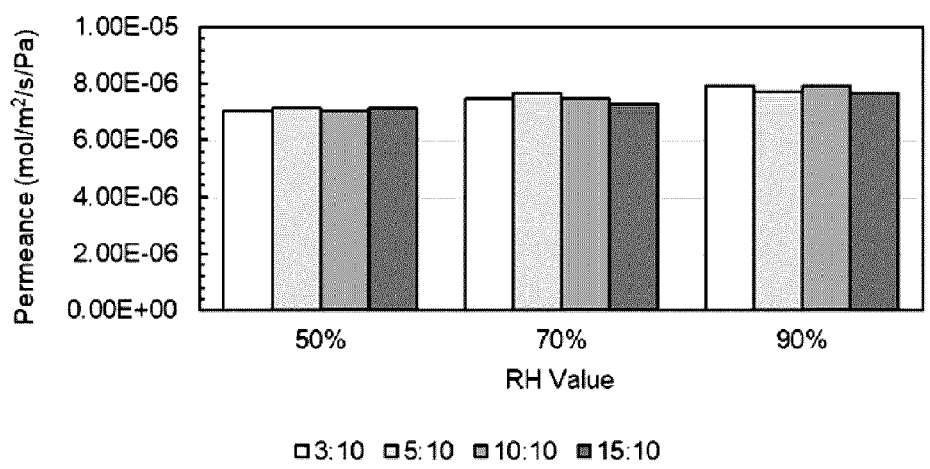
FIG. 15B depicts a graph of water vapor permeance (mol·s$^{-1}$·m$^{-2}$·Pa$^{-1}$) vs. relative humidity (RH, %) showing dehumidification performance of membranes comprising films of pure GO and 2:8 ACNF-GO crosslinked with various concentrations of EDA and deposited on corona discharge-treated PE12 substrates.

The effect of the amount (mass) of EDA crosslinker relative to the amount (mass) of GO or ACN-GO composite on water permeance was investigated for membranes comprising films of GO and 2:8 GO-ACN deposited on a corona treated PE12 substrate. FIG. 14 shows that the crosslinker concentration does not significantly affect permeance of membranes used in pervaporation applications. FIG. 15A and FIG. 15B shows that the concentration of the crosslinker does not significantly affect the permeance of membranes used for dehumidification applications. Thus, crosslinker concentration can be increased or decreased to adjust other properties such as abrasion resistance or cost without compromising permeance performance.

Example 8—Effect of Type of Crosslinker on Water Permeance

The effect of different crosslinkers on water permeance of membranes comprising films of GO and 2:8 ACNF-GO deposited on corona discharge-treated PE12 substrates was investigated. Alternative crosslinking compounds investigated included adipic acid dihydrazide (AAD), hexane diamine (HDA), ethane dithiol (EtSH), and urea (UR). Films of UR and EtSH membranes were too fragile when wiped with a kimwipe so they were not tested in dehumidification or pervaporation test apparatuses.

Figure 16:
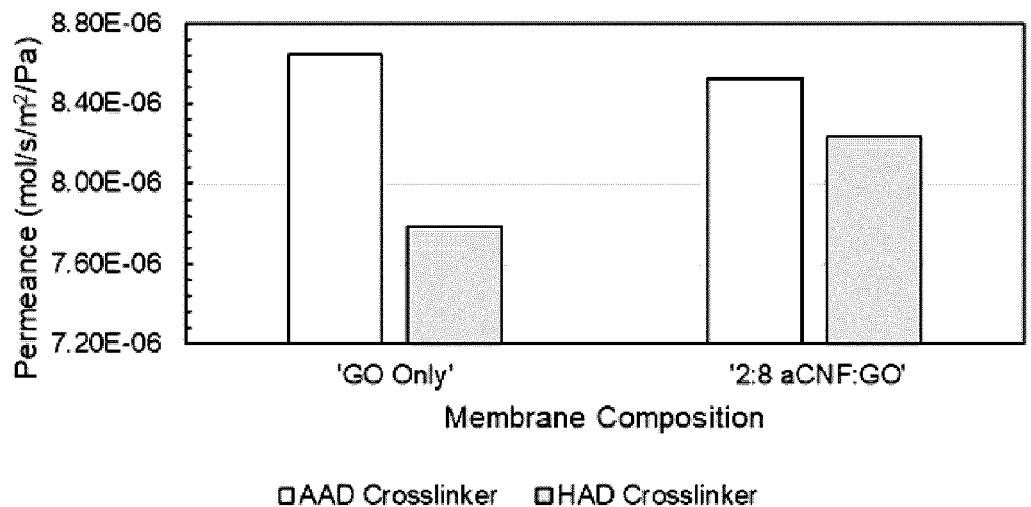
FIG. 16 depicts a graph of water vapor permeance (mol·s$^{-1}$·m$^{-2}$·Pa$^{-1}$) vs. relative humidity (RH, %) showing pervaporation permeance of membranes of GO and ACNF-GO crosslinked with different crosslinkers (adipic acid dihydrazide (AAD) and hexane diamine (HDA)) on a PE12 substrate.
Figure 17:
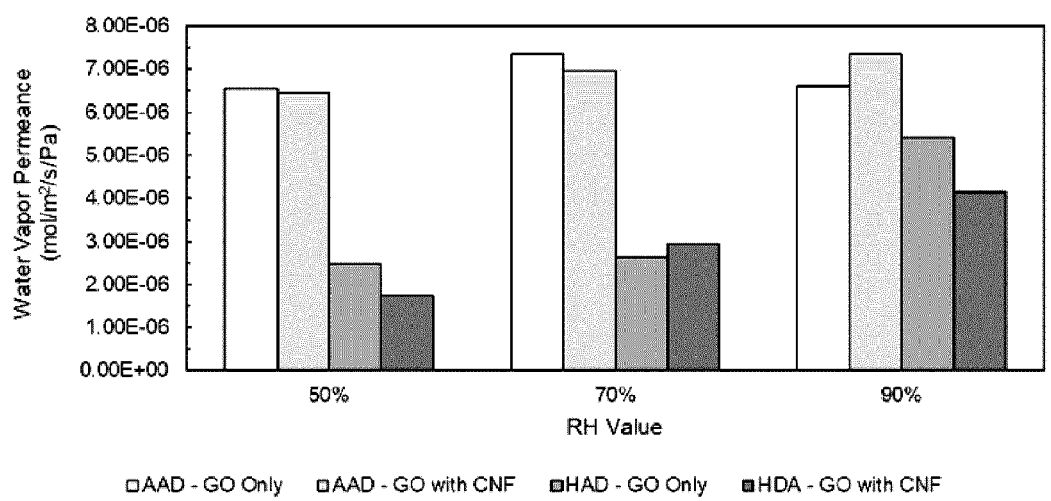
FIG. 17 depicts a graph of water vapor permeance (mol·s$^{-1}$·m$^{-2}$·Pa$^{-1}$) vs. relative humidity (RH, %) showing dehumidification performance of the membranes of FIG. 16.

FIG. 16 shows that the membranes crosslinked with AAD perform better than membranes crosslinked with HDA in pervaporation applications. Compared to membranes crosslinked in 10:10 EDA in FIG. 5, AAD-crosslinked membranes performed comparatively well, though EDA-crosslinked membranes performed better. FIG. 17 shows that AAD-crosslinked membranes perform better than HDA-crosslinked membranes in dehumidification applications. In dehumidification applications, AAD-crosslinked membranes outperformed EDA-crosslinked membranes at 50% and 70% RH with no CNF but for the samples with 2:8 aCNF:GO the EDA was superior.

The novel features will become apparent to those of skill in the art upon examination of the description. It should be understood, however, that the scope of the claims should not be limited by the embodiments but should be given the broadest interpretation consistent with the wording of the claims and the specification as a whole.

The invention claimed is:

1. A separation membrane comprising:
    a surface functionalized substrate porous to a molecule of interest; and,
    a film of a crosslinked composite deposited on the substrate, the composite comprising 60-99.999 wt % of graphene oxide (GO) and 0.001-40 wt % of an aldehyde-modified cellulose nanomaterial (ACN), all weight percentages based on weight sum of the GO and the ACN.

2. The membrane of claim 1, wherein the GO is in the composite in a range of 80-95 wt % and ACN is in the composite in a range of 5-20 wt %.

3. The membrane of claim 1, wherein the composite is crosslinked with a diamine.

4. The membrane of claim 3, wherein the diamine is 1,2-ethylenediamine.

5. The membrane of claim 1, wherein ACN is nanofibers having a length-to-diameter aspect ratio of at least 10:1.

6. The membrane of claim 5, wherein the aspect ratio is in a range of 100:1 to 1,000:1.

7. The membrane of claim 1, wherein the surface functionalized substrate comprises oxygen-containing species.

8. The membrane of claim 1, wherein the surface functionalized substrate has an oxidized surface.

9. The membrane of claim 8, wherein the oxidized surface is produced by corona discharge.

10. The membrane of claim 1, wherein the substrate comprises a polyolefin.

11. The membrane of claim 10, wherein the polyolefin is polyethylene.

12. The membrane of claim 1, wherein the molecule of interest is water.

13. A process for producing a separation membrane as defined in claim 1, the process comprising:
    depositing an uncrosslinked composite comprising the graphene oxide (GO) and the aldehyde-modified cellulose nanomaterial (ACN) on a functionalized surface of the surface functionalized substrate to form a film of the uncrosslinked composite on the substrate; and,
    crosslinking the composite to form the film of the crosslinked composite on the substrate.

14. The process of claim 13, wherein the uncrosslinked composite is deposited on the substrate by depositing a dispersion of the GO and ACN on the substrate and removing liquid components of the dispersion to form the film of the uncrosslinked composite on the substrate.

15. The process of claim 14, wherein the liquid components of the dispersion comprise an aqueous medium, an alcohol or a mixture thereof.

16. The process of claim 13, wherein crosslinking is performed with a crosslinker and the crosslinker is used in a mass ratio of crosslinker to GO in a range of 3:10 to 14:10.

* * * * *